United States Patent Office 3,562,776
Patented Feb. 9, 1971

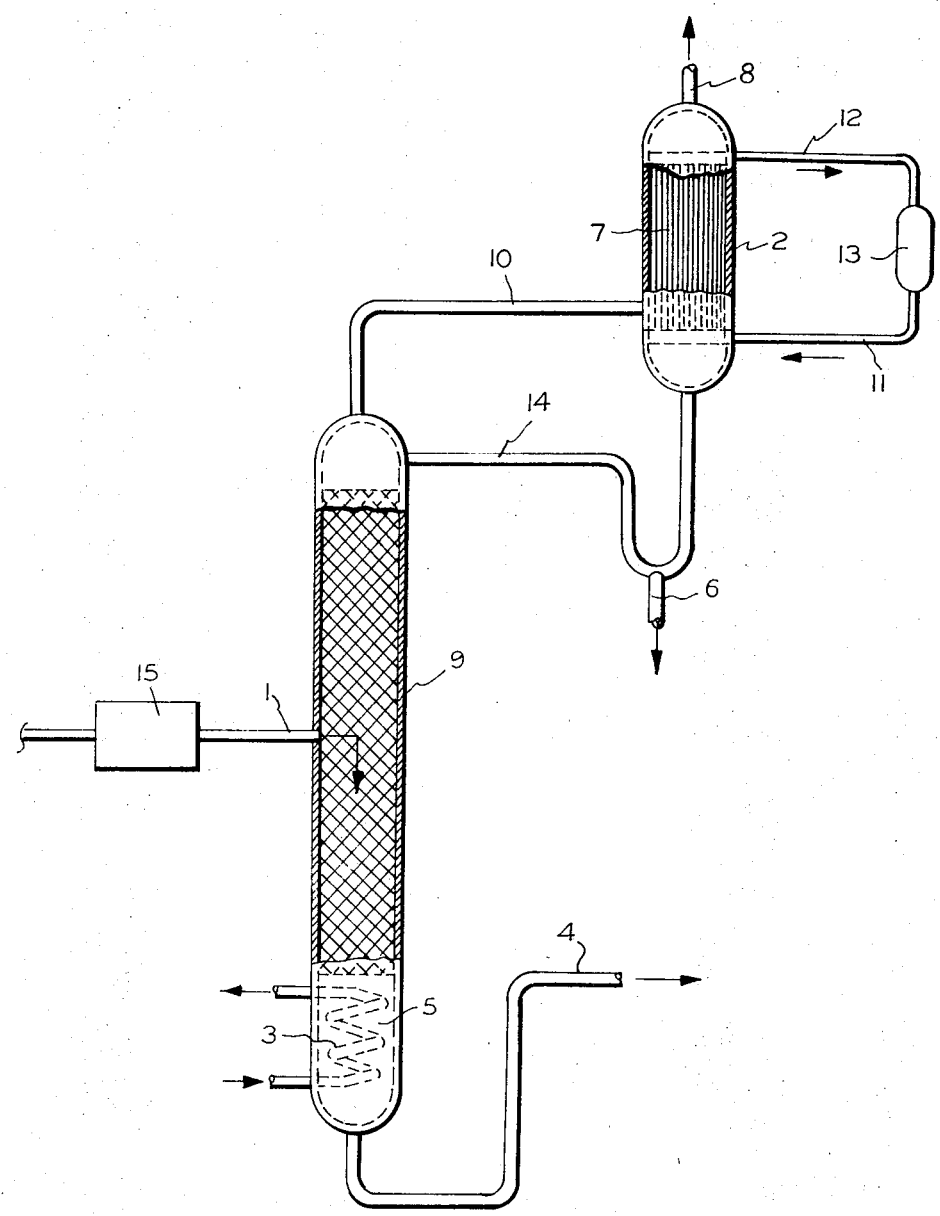

3,562,776
LOW TEMPERATURE SEPARATION OF CHLORINE, HYDROGEN CHLORIDE AND CYANOGEN CHLORIDE MIXTURES
Jean Riethmann and Leo Scheck, Basel-Land, Switzerland, assignors to Geigy Chemical Corporation, Ardsley, N.Y., a corporation of New York
Filed Dec. 30, 1968, Ser. No. 787,778
Claims priority, application Switzerland, Jan. 10, 1968, 322/68
Int. Cl. F25j *3/00, 3/08, 1/02*
U.S. Cl. 62—28                               2 Claims

ABSTRACT OF THE DISCLOSURE

A process for the recovery of constituents of a gaseous mixture formed in the catalytic production of cyanogen chloride or in the subsequent trimerization of the cyanogen chloride to cyanuric chloride in the vapor phase is described which comprises removing from the gaseous mixture consisting substantially exclusively of chlorine, hydrogen chloride and cyanogen chloride the hydrogen chloride by fractional distillation; the residual mixture of chlorine and cyanogen chloride can be recycled into the aforesaid process for producing cyanuric chloride.

DESCRIPTION OF THE INVENTION

The present invention relates to a process for the recovery of constituents from the gaseous mixture which is formed in the catalytic preparation of cyanogen chloride from hydrocyanic acid and chlorine and/or in the subsequent trimerization of the cyanogen chloride to cyanuric chloride in the vapor phase.

Several processes for producing cyanuric chloride in the vapor phase by catalytical trimerization of cyanogen chloride at elevated temperature are known. In these processes, the cyanogen chloride to be trimerized is prepared catalytically from dry mixtures of hydrocyanic acid (HCN) and chlorine ($Cl_2$) likewise at elevated temperature in the gas phase. The cyanogen chloride (ClCN) thus formed can be liberated from the coformed hydrogen chloride, and trimerized to cyanuric chloride in a further operation stage. Preferred, however, are those processes which proceed without isolation of the intermediate cyanogen chloride formed from hydrocyanic acid and chlorine to the trimerization to cyanuric chloride, according to the following reaction formula:

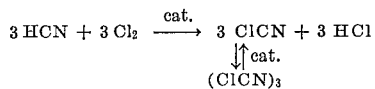

According to French Pat. 1,231,189, this reaction is carried out in one process operation with using active carbon as catalyst under superatmospheric pressures of 2–40 atmospheres and at temperatures substantially above 300° C. with using essentially stoichiometric amounts of hydrocyanic acid and chlorine. The cyanuric chloride thereby is separated in liquid form. Also a process of this kind which is carried out under normal pressure has become known (U.S. Pat. 2,762,798).

According to French Pat. 1,311,400, the trimerization of the cyanogen chloride to cyanuric chloride is effected in the presence of gaseous chlorine, whereby the catalyst is maintained in active condition over a longer period of time and the trimerization temperature could be decreased considerably. Also here, active carbon is the preferred catalyst. In the performance of this process, a considerable excess of chlorine, amounting to about 50%, is employed in the required chlorine-hydrocyanic acid mixture. While in this manner the trimerization temperature can be lowered to 250° C.—shifting the equilibrium in favor of the cyanuric chloride—the reaction proceeds relatively slowly and requires larger amounts of catalyst.

In the industrial performance of the process according to French Pat. 1,311,400, therefore, a dry gaseous mixture of hydrocyanic acid and chlorine is passed at 350° C. over active carbon which, owing to the chlorine excess, remains active over long periods of time. As it leaves the reactor, the cyanuric chloride formed by trimerization of the intermediarily formed ClCN desublimes with about 80% yield. The residual gaseous mixture consisting of hydrogen chloride, chlorine and cyanogen chloride is passed over active carbon in a second reactor also at 350° C. Thereafter further cyanuric chloride (about additional 15–18%) desublimes. In the residual gaseous mixture there then remain larger amounts of hydrogen chloride (45–50% by weight), chlorine (45–55% by weight) and smaller amounts of cyanogen chloride (1–5% by weight). The volume ratio of these gases is, on average, about 65:33:2.

In all of the above-described processes for the production of cyanogen chloride, respectively of cyanuric chloride on trimerization of the cyanogen chloride in the vapor phase, there are formed ternary gaseous mixtures which substantially exclusively consist of chlorine, cyanogen chloride and hydrogen chloride. Depending on the method employed, the proportions of these three constituents in the residual gaseous mixture may vary considerably. Unless the trimerization is effected immediately after the production of the cyanogen chloride, the proportion of cyanogen chloride in the gaseous mixture besides hydrogen chloride and unreacted chlorine is relatively high. If, however, the trimerization to cyanuric chloride is effected immediately after the formation of the cyanogen chloride in the direct process, the residual gaseous mixture after the desublimation of the cyanuric chloride formed comprises essentially chlorine and hydrogen chloride, besides little untrimerized cyanogen chloride.

Therefore, in connection with all of these processes there arises the economically very important problem of removing from this residual gaseous mixture as completely and in an as highly concentrated form as possible the hydrogen chloride as the major constituent in respect of volume, in order that the two other constituents chlorine and cyanogen chloride can be recycled into the catalytic preparation process for cyanuric chloride.

Heretofore, one of the following methods has been employed:

(1) The residual gaseous mixture is blown off or quantitatively destroyed by passing into liquor. Besides the great uneconomicalness of this procedure, there is involved a great danger of air and waste-water contamination.

(2) The hydrogen chloride is washed out from the residual gaseous mixture by means of water (French Pats. 1,231,189 and 1,311,400). This method has the great disadvantage that substantially valueless, strongly dilute hydrochloric acid is obtained and the remaining gases—chlorine and cyanogen chloride—must be redried before being recycled to the process. The formed aqueous hydrochloric acid in addition saponifies a more or less large proportion of the valuable cyanogen chloride, and this the more, the higher the concentration of the waste hydrochloric acid is selected. For this reason, it is not possible to operate such a separation process, based upon the extraction of the hydrogen chloride with water, in such an economical way that both the unreacted cyanogen chloride is quantitatively recovered and, at the same time, a technically usable hydrochloric acid of commercial concentration is obtained as by product. Either the concentrated aqueous hydrochloric acid has to be left out, or a large proportion of the valuable cyanogen chloride will be lost.

It is also known that even smallest traces of water disturb irreversibly the mechanism of the trimerization due to poisoning of the catalyst, so that compulsorily the gaseous mixture, consisting of chlorine and cyanogen chloride, obtained in the separation with water must be subjected to a strong, and hence expensive, drying step prior to recycling it to the production process.

(3) The gases are separated by absorption, particularly by means of active carbon, from the hydrogen chloride which is not retained (French Pat. 1,231,189, U.S. Pat. 3,338,898). Now, while it is easy to obtain the so purified hydrogen chloride in anhydrous form or as highly concentrated hydrochloric acid, the recycling of the residual gases absorbed on the active carbon to the process is associated with difficulties arising from the need to handle solids in a poisonous atmosphere. Also, the yields of recyclable gases are only moderate in this method.

The present invention solves the problem of separating the hydrogen chloride from the residual gaseous mixture obtained in the production of cyanogen chloride or its subsequent trimerization to cyanuric chloride, in a more satisfactory manner than the above described known methods.

The process according to the present invention for the recovery of constituents of a gaseous mixture formed in above-mentioned production of cyanogen chloride and cyanuric chloride comprises introducing a gaseous mixture consisting substantially exclusively of chlorine, hydrogen chloride and cyanogen chloride free from water or other polar solvent into a closed continuous fractionating apparatus, completely liquefying the dry mixture therein by cooling, and then subjecting the condensate to fractional distillation in a fractionating column within a temperature range between the boiling point of hydrogen chloride and that of the cyanogen chloride/chlorine mixture and withdrawing highly concentrated liquid hydrogen chloride from the top of the column and a gaseous mixture, more than 97% by weight of which consists of chlorine and unpolymerized cyanogen chloride from the bottom of the column, the balance consisting of hydrogen chloride.

The effective separation of the liquefied HCl from the remaining liquefied gases by low temperature in the process of the invention is, indeed, very surprising to those skilled in the art, as it is known from a number of publications that hydrogen chloride and chlorine catalyze even in the cold, extraordinarily strongly the polymerization of cyanogen chloride to cyanuric chloride (e.g. Ullmanns Encyclopädie der technischen Chemie, 5th volume, page 665; Liebigs Annalen der Chemie 155, 175 (1870), 287, 358/59 (1895); A. Hantzsch and L. Mai, Ber. 28, 2472 (1895); U.S. Pat. 2,417,659; U.S. Pat. 416,656; Swiss Pats. 334,629 and 337,539; German Pat. 1,193,955).

Therefore, from all of these publications it was clearly to be expected that a distillative separation of hydrogen chloride from liquefied mixtures of cyanogen chloride, hydrogen chloride and chlorine, due to the relatively long time of stay, would be impossible because a substantially quantitative polymerization of the cyanogen chloride to cyanuric chloride would take place at the low temperatures involved. Surprisingly, this is not the case.

A trimerization of the cyanogen chloride to cyanuric chloride during separation of the residual gases is very undesirable. On the one hand, the separation of the formed cyanuric chloride from the distilling vessel would be very complicated and require special apparatus, a fact which, in view of the low amounts of cyanuric chloride to be expected (1–2% of the residual gas), would not be acceptable from an economical point of view; on the other hand, in liquid phase polymerization there is a strong tendency to form larger amounts of undesired tetrameric cyanogen chloride instead of cyanuric chloride. Therefore, a polymerization of the cyanogen chloride in the separation of the residual gases by low temperature distillation must be avoided.

The complete absence of water or another polar solvent in the gaseous mixture (which in itself is normally assured by its origin from the catalytic process as eventual traces of water still present are converted, at the high temperatures applied therein, by reaction of the water with cyanogen chloride into innocuous compounds such as phosgene and hydrogen chloride) can be further ensured, if necessary, by means of a drying tower containing e.g. phosphorus pentoxide. Such absence of polar solvents, especially water, appears to be critical for a successful performance of the process according to the invention without polymerization of the cyanogen chloride.

In accordance with the invention, it becomes possible, in a simple and technically easily realizable manner, to recycle the cyanogen chloride and chlorine of the residual gases to the cyclic process of cyanogen chloride production and trimerization, and at the same time to recover as distillate highly concentrated, commercially readily utilizable hydrogen chloride.

The distillative separation of the residual gases according to the invention is preferably carried out at normal pressure; the liquefying of these gases consequently must be effected by cooling to temperatures below the boiling point of the lowest boiling component.

The boiling points of the main components in the residual gas to be separated are as follows:

| | Mol. weight | B.P. (760 mm. Hg.), °C. |
|---|---|---|
| Chlorine (Cl$_2$) | 70.01 | −35 |
| Cyanogen chloride (ClCN) | 61.48 | 13 |
| Hydrochloric acid (HCl) | 36.47 | −84 |

In some cases, the residual gaseous mixture may still contain traces of $CO_2$ and $COCl_2$, which, however, do not appreciably affect the performance of the separation process according to the invention.

Optionally, the distillation may be carried out at slightly elevated pressure, in which case the above-indicated boiling points of the liquefied gases will be respectively higher, so that a less intense cooling will be needed for liquefying.

In the distillation, the hydrogen chloride as the lowest boiling component passes over first (distillate) and is collected by condensation. Since the boiling point interval to the nearest boiling component is large (50° C.), the separation is sharp and almost quantitative. The remaining liquefied fraction consists essentially of ClCN and Cl$_2$.

At normal pressure the distillation temperature is between −85° and −20° C., depending on the measuring point in the apparatus.

The requirement to operate with absolute exclusion of any traces of water or other polar solvent allows the recovered chlorine and cyanogen chloride to be recycled to the production process without separate drying.

Both the distillate (HCl) and the remaining liquefied fraction (Cl$_2$+ClCN) may be taken from the fractionating apparatus either in gaseous or in liquid state, as desired, so that both the recycling of Cl$_2$ and ClCN to the production process and the storing of pure liquid HCl can be optimized from the economic standpoint.

Especially advantageous is the fact of continuously recycling the mixture of chlorine and cyanogen chloride formed in the sump into the reactor for the production of cyanuric chloride. This can be accomplished in simple manner by connecting to the distillation vessel an overflow means over which the liquid mixture of chlorine and cyanogen chloride is passed to a vaporizer and then admixed in gaseous form with the starting gases of the production operation (hydrocyanic acid and chlorine) and introduced into the reactor.

The cooling for liquefying the residual gaseous mixture to be distilled is performed by means of a heat exchanger which for example, is operated with boiling difluorochloromethane at ca. 15 mm. Hg pressure.

The fractionating apparatus used for the performance of the process according to the invention, by way of example, is illustrated in more detail with reference to the attached schematical drawing.

The distillation apparatus comprises a distillation column 9 provided with filling bodies (hatched), at half the height of which column the inlet tube 1 for the residual gaseous mixture to be separated enters. Above the head of the column there is disposed a cooling system 2 including a heat exchanger 7, which cooling system is maintained at a temperature of —105 to —100° C., e.g. by means of difluorochloromethane as coolant, said coolant being under a pressure of 15–20 torr. The liquid coolant is supplied to the lower portion of the heat exchanger 7; it leaves it in vaporous form in its upper portion for being reliquefied in a condenser system of conventional construction. The lower portion of the column 9 is maintained on average at temperatures between —40 and —20° C., and preferably between —25 and —35° C. by a circulation-type heating system 3 for the distillation vessel 5. The discharge conduit 4 serves for the continuous removal of the obtained liquid chlorine/cyanogen chloride which after evaporation is recycled to the process for the production of the cyanuric chloride.

Underneath the heat exchanger 7, at 6, the condensed pure liquid hydrogen chloride is withdrawn by means of a reflux distributor. For the performance of the distillative separation at atmospheric pressure, the outlet 8 serves to vent the apparatus.

The following non-limitative example and the accompanying drawing which shows schematically an apparatus for carrying out the above-described process in practice serves to illustrate the invention further.

Example

A residual gaseous mixture obtained from the process described in French Pat. 1,311,400 for the catalytic production of cyanuric chloride in the gas phase from dry mixtures of chlorine and hydrocyanic acid and separation of the solid cyanuric chloride formed by trimerization, which gaseous mixture is completely free from polar solvents and consists of 50 parts by weight of hydrogen chloride, 48 parts by weight of chlorine and 2 parts by weight of cyanogen chloride, is fed through conduit 1 into the fractionating column 3 shown in the accompanying drawing, which column is provided with glass coils as filling bodies. Initially, the entire gas mixture passes through line 10 into a heat exchanger 7 in which it is completely condensed by intense cooling to a temperature of about —100° C. The heat exchanger 7 is operated with difluorochloromethane having a temperature of about —100 to —103° C. and being under reduced pressure of about 15 to 20 torr. This coolant enters the heat exchanger in the liquid state via line 11 and leaves the same via line 12; it is re-liquefied in a station 13 in a conventional manner.

All of the condensate formed in heat exchanger 7 is initially returned into the fractioning column through line 14.

The liquid which descends in the column gathers in a still 5 below the latter, where it is heated by means of a heating coil 3 so that a medium boiling temperature of —31° to —25° C. is maintained in the sump, while, after establishment of distillation equilibrium in the column 9, the gaseous phase at the top of the column has a temperature of about —85° C., which corresponds to the boiling point, at atmospheric pressure, of substantially pure hydrogen chloride.

With distillation equilibrium in column 9, the concentration of hydrogen chloride at the lower end of the column is at most about 2.5% or even less, while the concentration of chlorine and cyanogen chloride at the top of the column is also at most 2.5% or less of the total amount of substance.

After the level, in the still, of condensate which consists practically exclusively of a liquid mixture of chlorine and cyanogen chloride, has risen to the level of the overflow 4, such mixture is withdrawn from the discharge end of the overflow at the same rate as fresh chlorine and cyanogen chloride in the gaseous state are fed into the distillation column 9 through conduit 1 while, at the same time, the withdrawal of liquid hydrogen chloride, having a temperature of about —85° C., is begun through discharge valve 6, at the same rate at which fresh hydrogen chloride gas is fed, in mixture with the other two components, through conduit 1 into column 9.

The average time of stay of the mixture of chlorine and cyanogen chloride in the still 5 is about 10–11 hours or less. The composition of the distillate at 6 and the liquid in the still 5 is determined by analysis of individual samples as well as of collective fractions taken over 24 hours. The separation of the above-described input mixture into the chlorine/cyanogen chloride mixture on the one hand and hydrogen chloride on the other hand is shown in the following table (wherein all "parts" are parts by weight, calculated on the starting mixture):

|  | Starting mixture, parts | Hydrogen chloride phase at 6, parts | Chlorine/ cyanogen chloride phase at 5, parts |
|---|---|---|---|
| Hydrochloric acid | 50 | 47.5 | ca. 2.3 |
| Chlorine | 48 | ¹ 0–2.5 | 46.65 |
| Cyanogen chloride | 2 | 0 | 2 |
| Cyanuric chloride | 0 | 0 | 0 |

¹ On average 1.44 parts.

No cyanuric chloride could be found either in the sump liquid or in the distillate.

By recycling of the chlorine/cyanogen chloride phase withdrawn at 4 from the distillation apparatus into a cyanuric chloride synthesis, small amounts of hydrogen chloride are reintroduced into the reaction. However, the concentration of the hydrogen chloride at the inlet of the catalysis furnace does not affect the trimerization action.

The foregoing example shows that the selectivity in the distillative separation of hydrogen chloride from the two other gases in the process according to the invention is so effective, that it readily permits the mixture of chlorine and cyanogen chloride to be directly recycled to the production process.

The procedure of the foregoing example may also be carried out with a dry gaseous mixture consisting of 60.5 parts by weight of cyanogen chloride, 36.0 parts by weight of hydrogen chloride and 3.5 parts by weight of chlorine, obtained by the reaction of hydrocyanic acid and chloride before trimerization to cyanuric chloride. Conduit 1 can be equipped with a drying station 15, charged for example with phosphorus pentoxide, in which any water or other solvents that may be admixed with gaseous mixtures from the other sources, can be removed.

We claim:
1. A process for the recovery of constituents of a gaseous mixture formed in the catalytic prepartion of cyanogen chloride from hydrocyanic acid and chlorine or in the subsequent trimerization of the cyanogen chloride to cyanuric chloride in the vapor phase after condensation of the latter, comprising introducing a gaseous mixture consisting substantially exclusively of chlorine, hydrogen chloride and cyanogen chloride free from any water or other polar solvent into a closed continuous fractionating appaatus, completely liquefying the dry mixture therein by cooling, and then subjecting the condensate to fractional distillation in a fractionating column within a temperature range between the boiling point of the hydrogen chloride and that of the cyanogen chloride/chlorine mixture and withdrawing highly concentrated liquid hydrogen chloride from the top of the column and a mixture consisting essentially of chlorine and cyanogen chloride from the bottom of the column.

2. The process described in claim 1, wherein the distillation is carried out at atmospheric pressure and at a temperature between —40 and —20° C., measured at the bottom of the fractionating column.

References Cited

UNITED STATES PATENTS

| | | | |
|---|---|---|---|
| 2,672,398 | 3/1954 | Huemer | 23—359 |
| 2,753,346 | 7/1956 | Huemer | 23—359 |
| 3,498,761 | 3/1970 | Suryanarayana | 23—154 |

OTHER REFERENCES

R. Oleinek, Chlorination of Hydrocyanic Acid, Rev. Chim. (Bucharest) 16(1), pp. 19–22, (1965), (Rumania), in Chem. Abstracts.

NORMAN YUDKOFF, Primary Examiner

A. F. PURCELL, Assistant Examiner

U.S. Cl. X.R.

23—154, 359, 367